Harvey & Ford.
Canes & Umbrellas.
N° 30,225. Patented Oct. 2, 1860
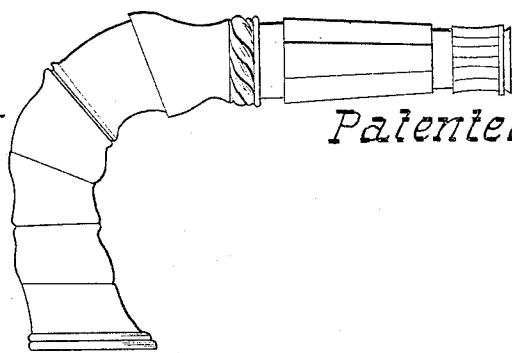
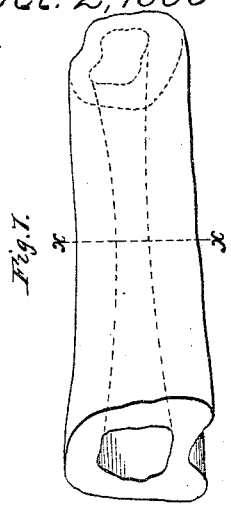
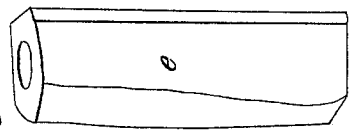
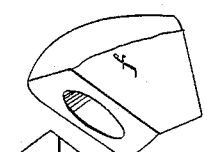
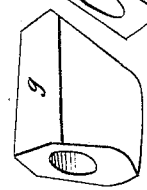
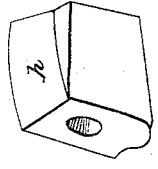
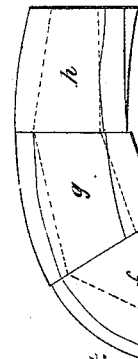
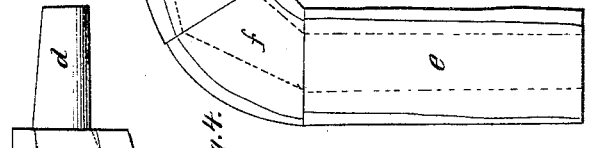
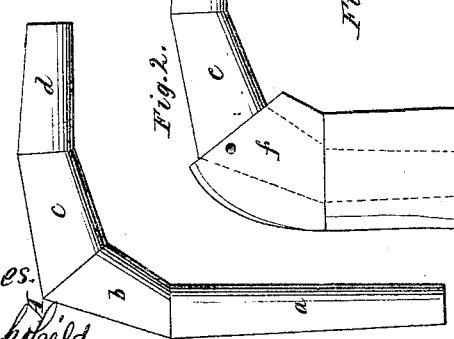
Witnesses.                    Inventors
Albert Schofield              Joseph Harvey
John White                    Edwin Ford

UNITED STATES PATENT OFFICE.

J. HARVEY AND E. FORD, OF PHILADELPHIA, PENNSYLVANIA.

HANDLE FOR CANES, &c.

Specification of Letters Patent No. 30,225, dated October 2, 1860.

*To all whom it may concern:*

Be it known that we, JOSEPH HARVEY and EDWIN FORD, both of the city and county of Philadelphia and State of Pennsylvania, have invented a new and useful improvement in the art, process, or mode of making handles for canes, umbrellas, and other articles that require curved or hook-shaped handles; and we do hereby declare that the following is a full, clear, and exact description of the same.

The usual method of making handles for canes, umbrellas and other articles requiring hook shaped handles is either to make the handles of a single piece of ivory, bone or other material cut out into the above form or to compose them of several pieces, screwed together, one end of one piece being made small in the form of a tenon, with a screw thread cut thereupon, which fits into the end of another piece having a corresponding cavity with a screw thread or nut cut therein. This latter method is defective because unless the body of the material of which the handle is to be composed is large and solid, it is impossible to make a firm joint. If the handle is solid and large enough to give the proper strength it will then be so bulky when finished as to be clumsy, heavy and unfitted for the convenient grasp of the hand. If made of one piece of ivory, such handles are also very expensive so that they are not adapted for general use. And it has heretofore been impossible to make bone handles in curved form owing to the large hole which naturally exists in the center of the material. This renders it impossible to screw the parts together otherwise than at right angles or in straight lines, as the thinness of the shell of the bone prevents the formation of inclined or beveling screws and nuts upon the parts. Another method of uniting the parts of which the handle is to be composed is to insert short metallic screws between the parts and screw them together upon the screws. But this is an expensive mode, is wanting in strength, and cannot be practically applied to the making of handles of bone.

Bone handles when nicely finished present a considerable resemblance to ivory, and as bone is a much cheaper article it is obvious that it might be extensively used as a substitute for ivory if any mode could be devised by which handles of curved form could be made. Curved handles made of solid ivory have long been known but as they must be cut out of solid pieces of ivory they are always of very small size, and even then quite expensive, owing to the waste of the material consequent upon cutting such forms out of solid blocks, and as these parts are united by screwing one into the other of course the strength of the handle thus made depends exclusively upon the weight or size of the material.

Our invention consists in the method, art or process hereinafter described for making handles for canes, umbrellas, and other articles.

Figure 1 is a view of one of our models or forms having four tapered angles and used in the formation of a curved handle. Fig. 2 is a view of the same form with two of the tapered angles covered with the rough blocks of bone preparatory to making the handle. Fig. 3 is a view of the same form with three of the angles covered with the rough bone blocks. Fig. 4 is a view of the same form with all the angles covered with the rough bone blocks. Fig. 5 is a view of the rough sections of bone or other material bored with tapering holes and ready to be slipped upon the tapering angles. Fig. 6 is a view of a finished handle of curved style, the interior form thereof having four tapering angles of the form shown in Fig. 1. Fig. 7 is a view of the bone, in its natural state, of which handles are made.

Similar letters of reference indicate corresponding parts in the several figures.

Our invention is peculiarly suited to the employment of bone because the interior of each piece of bone, in its natural state, is hollow, and the cavity is smaller in the middle than at the extremities, as shown by the dotted lines, Fig. 7. To prepare the bone for our tapered angles it is only necessary to saw them apart in the middle as shown at the red line $x$, $x$, Fig. 7, when two pieces will be formed each of which then has a cavity of tapering or conical form. The cavity of the pieces are then reamed out, with a suitable tool and enlarged or rounded and smoothed; they may be then subdivided and their ends mitered when they are ready to be slipped upon the tapering angles $a$, $b$, $c$, $d$, of the form or model A, the largest end of each section being placed toward the middle of the handle as shown in the drawings $e$, $f$, $g$, $h$, representing the sections. By dividing the bone into sections and using the tapered angular forms, we are enabled to place the smaller pieces of bone upon the smallest parts of the form thus effecting an important saving in the stock. The same useful result ensues when ivory is employed, for we are enabled to use small pieces of ivory in a similar manner, and yet produce a handle which is very strong and serviceable. In using bone we employ a form or model made of wood owing to the large size of the natural cavity of the bone and cover it with glue to hold the sections, prior to placing on the sections. But ivory being more dense and solid, we employ in using this material, a metallic form or model made with the tapered angles as before described.

The ends of the metallic forms are provided with screw threads and the interior of the last section of the upper part of the handle is provided with a corresponding thread, so that this section screws upon the extremity of the form. The screw at the other or lower end of the form is intended to enter the stalk to which the handle is to be attached and when the handle is screwed to the stalk the sections are thereby prevented from becoming loose in getting out of place. When the wooden model or form is used we bore out the lower extremity of the handle after the sections have been placed, sufficiently to admit the tip of the stalk, cane, or umbrella stick to which the handle is to be attached.

By having the forms or models made with tapering angles we are enabled to fit the sections of the material firmly and separately to each angular portion, the cavity in the material being of the same size and shape as the angle of the model or form. The handle is thus rendered solid and strong, and the sections composing the handle cannot get loose or misplaced, owing to the conical or tapering shape of the angles of the forms, and the cavities in the material, the harder the sections are pressed upon the forms the tighter and more firm will they be held.

It is obvious that by our invention ivory, bone, horn, vulcanized rubber, ornamental stone and other materials may, by using our tapering angles upon the form, be wrought into almost any desired shape and yet preserve great strength and durability.

While we do not limit ourselves to the use of any particular number of tapering angles upon our forms or models we would not be understood as claiming broadly the stringing of blocks or sections upon rods or forms nor the mitering of the blocks for we are aware that stair rails of curved form have been made of mitered blocks held together by a central strengthening rod; but

Having thus described our invention we claim and desire to secure by Letters Patent—

The art, process or mode of making handles, herein shown and described, consisting substantially in the employment of forms or models composed of tapered angles and the providing of the sections of which the handle is to be composed with tapered apertures and the fitting of said sections upon said tapered angles, all as herein set forth and represented.

JOSEPH HARVEY.
EDWIN FORD.

Witnesses:
ALBERT R. SCHOFIELD,
JOHN WHITE.